(12) United States Patent
Zhu et al.

(10) Patent No.: US 11,205,872 B2
(45) Date of Patent: Dec. 21, 2021

(54) CONNECTOR ASSEMBLY WITH AN ELASTIC PIECE

(71) Applicant: HYC Co., Ltd, Qingyuan (CN)

(72) Inventors: Lei Zhu, Qingyuan (CN); Haibo Yang, Qingyuan (CN)

(73) Assignee: HYC Co., Ltd, Qingyuan (CN)

( * ) Notice: Subject to any disclaimer, the term of this patent is extended or adjusted under 35 U.S.C. 154(b) by 0 days.

(21) Appl. No.: 16/910,948

(22) Filed: Jun. 24, 2020

(65) Prior Publication Data

US 2021/0151925 A1    May 20, 2021

(30) Foreign Application Priority Data

Nov. 15, 2019    (CN) .......................... 201911119841.3

(51) Int. Cl.
| | |
|---|---|
| *H01R 13/506* | (2006.01) |
| *G02B 6/38* | (2006.01) |
| *H01R 13/52* | (2006.01) |
| *H01R 13/627* | (2006.01) |
| *H01R 13/629* | (2006.01) |

(52) U.S. Cl.
CPC ......... *H01R 13/506* (2013.01); *G02B 6/3893* (2013.01); *H01R 13/5213* (2013.01); *H01R 13/627* (2013.01); *H01R 13/629* (2013.01)

(58) Field of Classification Search
CPC .................... H01R 13/506; H01R 13/5213; H01R 13/627; H01R 13/6335; H01R 43/26; G02B 6/3893; Y10S 439/923
See application file for complete search history.

(56) References Cited

U.S. PATENT DOCUMENTS

| | | | |
|---|---|---|---|
| 6,447,170 B1 * | 9/2002 | Takahashi .......... | H01R 13/6335 439/352 |
| 7,901,237 B2 * | 3/2011 | Abe ...................... | H01R 43/26 439/483 |
| 9,941,631 B1 * | 4/2018 | Taira .................. | H01R 13/6335 |
| 2007/0098329 A1 * | 5/2007 | Shimoji ............... | G02B 6/3893 385/76 |

* cited by examiner

*Primary Examiner* — Tho D Ta
(74) *Attorney, Agent, or Firm* — Andrus Intellectual Property Law, LLP

(57) ABSTRACT

Disclosed is a connector assembly. The connector assembly includes an adapter, a connector and a handle, where a first socket is formed at one end of the adapter, an adaptation slide extending inwards from the first socket is formed in an inner wall of the adapter, and an adaptation window is opened at one end of the adaptation slide close to the first socket; the connector is provided with an elastic piece, and the elastic piece is movable along a Z-axis direction; and the handle is connected to a rear end of the connector and is capable of sliding between a first position and a second position of the connector along an X-axis direction. The beneficial effect provided is as below. The handle always remains connected to the connector.

9 Claims, 3 Drawing Sheets

CONNECTOR ASSEMBLY WITH AN ELASTIC PIECE

CROSS-REFERENCE TO RELATED APPLICATION

This application claims priority to a Chinese patent application No. 201911119841.3 filed on Nov. 15, 2019, disclosure of which is incorporated herein by reference in its entirety.

TECHNICAL FIELD

The present disclosure relates to the technical field of connectors, and in particular, to a connector assembly.

BACKGROUND

In the configuration of present high density panels, a structural design of adjacent connectors and cable assemblies has certain defects that hinder the disassembly of the whole. For example, a user's hand is required to reach into a dense connector group and separate optical fibers around connectors from the connectors, which requires a large force. This force may easily damage the cables and connectors, and may generate security risks, impair the integrity and/or reliability of the terminal, and cause serious disruptions to network performance.

Although an operator may attempt to use a screwdriver to reach into a dense connector group to disassemble a mechanism, adjacent cables and connectors may interfere with the operator's line of sight, and resulting in difficulty in guiding a tool to the release mechanism without pushing away the adjacent cables. Even when the operator has a clear line of sight, it is troublesome to guide the tool to the inside of the connector. Therefore, when a single connector is disassembled, due to the design defect of the connector, it is easy to form interference to other adjacent connectors, such as misalignment of other connectors, resulting in interruption of equipment connection.

SUMMARY

An object of the present disclosure is to provide a connector assembly to solve the problem that the related connector is not easy to disassemble.

To achieve the objects, the present disclosure adopts technical solutions described below.

A connector assembly includes an adapter, a connector and a handle.

A first socket is formed at one end of the adapter, an adaptation slide extending inwards from the first socket is formed in an inner wall of the adapter, and an adaptation window is opened at one end of the adaptation slide close to the first socket.

The connector is provided with an elastic piece, and the elastic piece is movable along a Z-axis direction.

The handle is connected to a rear end of the connector and can slip between a first position and a second position of the connector along an X-axis direction.

A front end of the connector is capable of being inserted in the adaptation slide along the X-axis direction so that the elastic piece engages with the adaptation window in a snap-fit way, and during a sliding of the handle from the first position to the second position, the elastic piece deforms and disengages from the adaptation window.

The handle always remains connected to the connector. A position relationship between the handle and the connector is adjusted through pulling the handle to adjust a state of the elastic piece. During a sliding of the handle from the first position to the second position, the elastic piece deforms and disengages from the adaptation window, thus separating the connector from the adapter. If it is necessary to connect the connector to the adapter, the connector can be pushed along the adaptation slide to achieve the connection.

Alternatively, the connector further includes a connector main body and a connector secondary body, where the connector main body is capable of being configured in the adapter, the connector secondary body is configured in the handle, an abutting step face is formed between the connector main body and the connector secondary body, and a limiting protrusion is formed at one end of the connector secondary body facing away from the connector main body, and where the abutting step face limits the first position, and the limiting protrusion limits the second position.

The connector includes the connector main body that can be configured in the adapter and the connector secondary body that is configured in the handle, and is provided with two restraining points limiting the slide of the handle.

Alternatively, one end of the connector main body close to the connector secondary body is gradually narrowed along the Z-axis direction, one end of the elastic piece is disposed on the connector main body, and the other end of the elastic piece extends to a lateral side of the limiting protrusion.

The one end of the elastic piece is fixed on the connector main body, and the one end of the connector body is gradually narrowed along the Z axis direction to form an interval between the other end of the elastic piece and the limiting protrusion. The other end of the elastic piece is movable along the Z axis direction due to the existence of the interval.

Alternatively, the elastic piece is provided with a first protrusion portion and a second protrusion portion, the first protrusion portion is configured to engage with the adaptation window in a snap-fit way, and the second protrusion portion is configured to engage with the handle.

The first protrusion portion can engage with the adaptation window in a snap-fit way to achieve the connection between the connector and the adapter, and the second protrusion portion can engage with the handle, so that no random shaking occurs between the handle and the connector.

Alternatively, a front end of the handle is provided with a front handle interface extending along the Z-axis direction, and a rear handle interface extending along the X-axis direction is formed in a rear end of the front handle interface, where the front handle interface is communicated with the rear handle interface, the connector secondary body is slidably disposed in the front handle interface and the rear handle interface, and at the same time, the second protrusion portion is capable of engaging with the front handle interface.

Alternatively, a front end of the front handle interface is provided with two first detent mechanisms, the connector secondary body protrudes into the front handle interface and the rear handle interface from between the two first detent mechanisms, and the two first detent mechanisms are slidably disposed between the abutting step face and the limiting protrusion.

The connector secondary body and the rear handle interface are located on a same straight line, and when the connector secondary body moves forwards and backwards along the X-axis direction, the connector secondary body is always limited between the abutting step face and the limiting protrusion by the first detent mechanism.

Alternatively, the front end of the front handle interface is provided with second detent mechanisms, where the second detent mechanisms are disposed at lateral sides of the two first detent mechanisms along the Z-axis direction, and the second protrusion portion is configured to be guided by the second detent mechanisms to move along the Z-axis direction.

The second protrusion portion is limited between the second detent mechanism and first detent mechanism, and the second protrusion portion is guided by the second detent mechanism to move in the Z-axis direction.

Alternatively, the front handle interface is a through interface along the Z-axis direction.

The front handle interface is a through interface along the Z-axis direction so that adjustment of the state of the elastic piece is facilitated.

Alternatively, two ends of the connector along the Z-axis direction are provided with two elastic pieces on a one-to-one basis, where a front end of the two elastic pieces is further provided with a key, and the key fits in the adaptation slide.

The two elastic pieces are provided so that the connector is connected to the adapter along two directions of the Z-axis, thereby improving the stability.

Alternatively, a side of the handle corresponding to the key is provided with an appearance protrusion.

The appearance protrusion is provided on the side of the handle corresponding to the key so that it is convenient to distinguish an insertion direction.

The beneficial effect of the present disclosure is as below.

The handle always remains connected to the connector. The position relationship between the handle and the connector is adjusted through pulling the handle to adjust the state of the elastic piece. During the sliding of the handle from the first position to the second position, the elastic piece deforms and disengages from the adaptation window, thus separating the connector from the adapter. If it is necessary to connect the connector to the adapter, the connector can be pushed along the adaptation slide to achieve the connection.

Figure 1:
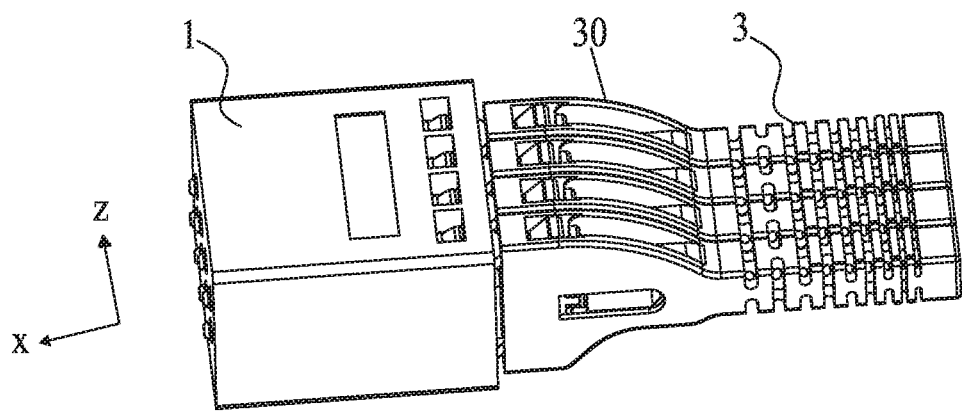
FIG. 1 is a structure view of a connector assembly according to an embodiment of the present disclosure.

REFERENCE LIST 1 adapter
2 connector
3 handle
11 adaptation slide
12 adaptation window
20 elastic piece
21 connector main body
22 connector secondary body
30 appearance protrusion
31 front handle interface
32 rear handle interface
201 first protrusion portion
202 second protrusion portion
203 key
210 abutting step face
220 limiting protrusion
321 first detent mechanism
322 second detent mechanism

DETAILED DESCRIPTION

Hereinafter the present disclosure will be further described in detail in conjunction with the drawings and embodiments. It is to be understood that the specific embodiments set forth below are intended to illustrate and not to limit the present disclosure. Additionally, it is to be noted that, for ease of description, only part, not all, of the structures related to the present disclosure are illustrated in the drawings.

In the description of the present disclosure, unless otherwise expressly specified and limited, the term "connected to each other", "connected" or "fixed" is to be construed in a broad sense, for example, as permanently connected, detachably connected, or integrated; mechanically connected or electrically connected; directly connected to each other or indirectly connected to each other via an intermediary; or internally connected or interactional between two components. For those skilled in the art, the preceding terms can be construed depending on specific contexts.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the present embodiment, the orientation or position relationships indicated by terms "above", "below", "right" and the like are based on the orientation or position relationships shown in the drawings, merely for facilitating description of the present disclosure and simplifying operation, and these relationships do not indicate or imply that the referred device or element has a specific orientation and is constructed and operated in a specific orientation, and thus it is not to be construed as limiting the present disclosure. In addition, the terms "first" and "second" in the specification are only used for descriptive purposes and have no special meanings.

Figure 2:
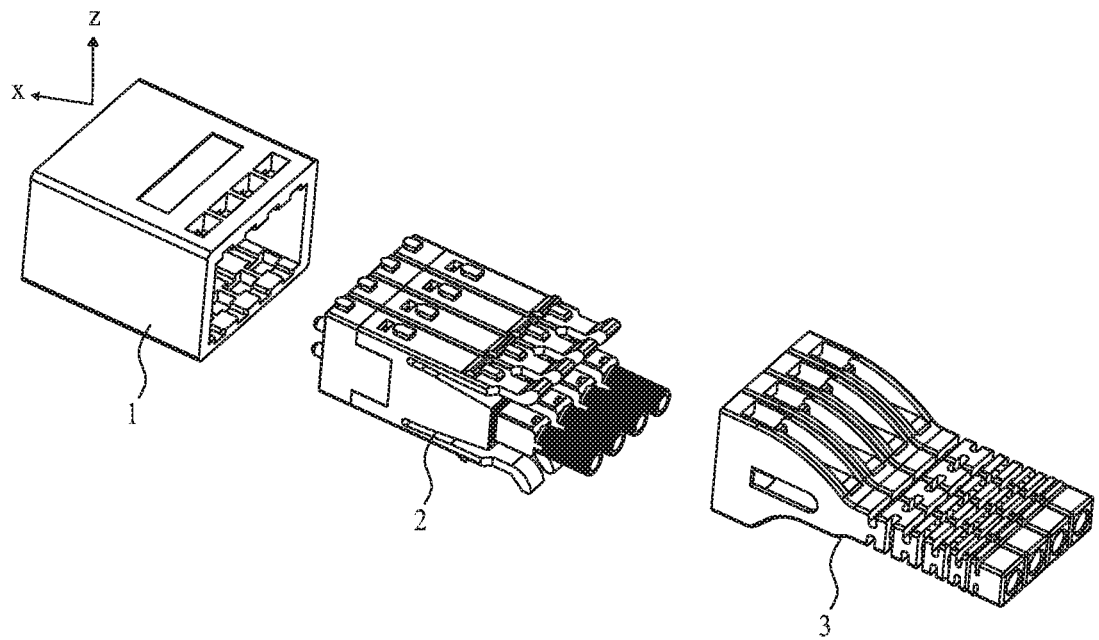
FIG. 2 is an exploded view of the connector assembly shown in FIG. 1 of the present disclosure.

A connector assembly is provided in the present disclosure and includes an adapter 1, a connector 2 and a handle 3, as shown in FIGS. 1 and 2. One end of the connector 2 is detachably connected to the adapter 1, and the other end of the connector 2 is slidably connected to the handle 3. The connector 2 is internally provided with a ferrule and a wire harness, and the ferrule extends outwards from the inside of the connector 2. When the adapter 1 and the connector 2 are connected, the ferrule protrudes from the adapter 1, one end of the wire harness is connected to the ferrule, and the other end of the wire harness extends backwards into the handle 3. This part belongs to the related art and will not be repeated here.

Figure 4:
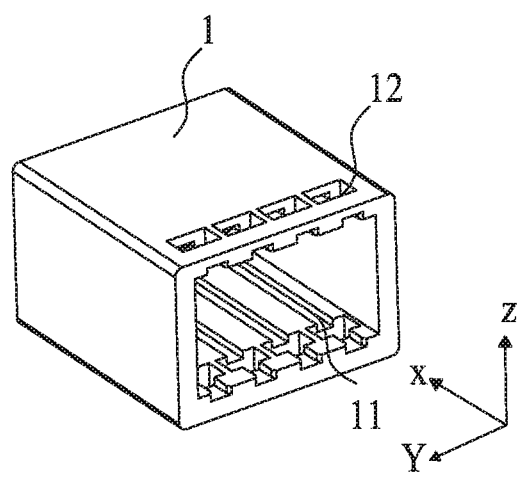
FIG. 4 is a structure view of an adapter of the connector assembly according to the embodiment of the present disclosure.

In combination with FIG. 4, a first socket is formed at one end of the adapter 1, an adaptation slide 11 extending inwards from the first socket is formed in an inner wall of the adapter 1, and an adaptation window 12 is opened at one end of the adaptation slide 11 close to the first socket.

In the present embodiment, four adaptation slides 11 and eight adaptation windows 12 are formed in the inner wall of the adapter 1 along a Y-axis direction.

It is to be noted that in another alternative embodiment, only one adaptation window 12 is provided for each of the four adaptation slides 11 along the Y-axis direction, and in this case, the adapter 1 has four adaptation windows 12.

Figure 3:
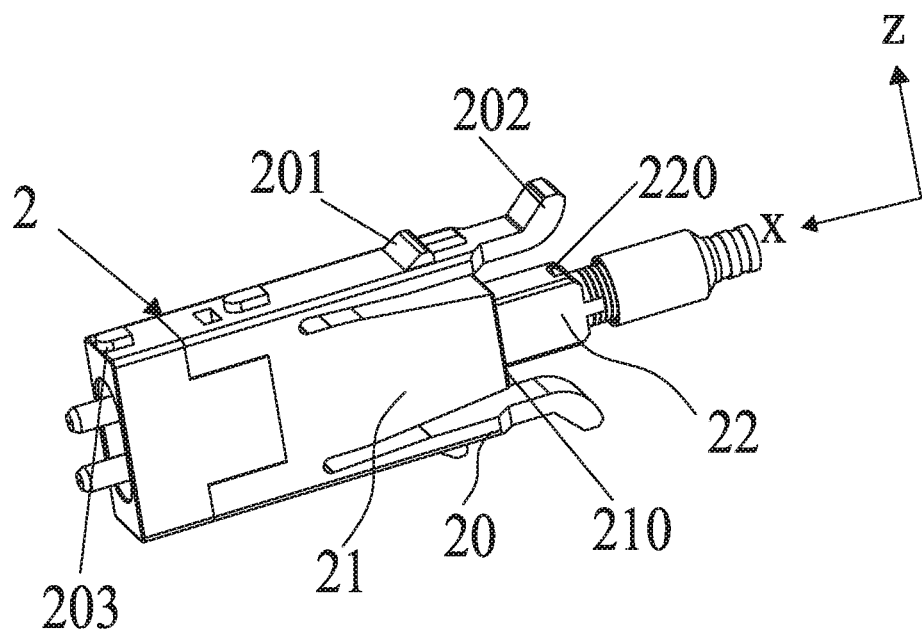
FIG. 3 is a structure view of a connector of the connector assembly according to the embodiment of the present disclosure.

Referring to FIG. 3, the connector 2 is provided with an elastic piece 20, and the elastic piece 20 is movable along a Z-axis direction.

The handle 3 is slidably connected to the connector 2 and can slide between a first position and a second position of the connector 2 along an X-axis direction. A front end of the connector 2 can be inserted in the adaptation slide 11 along the X-axis direction so that the elastic piece 20 engages with the adaptation window 12 in a snap-fit way. During the sliding of the handle 3 from the first position to the second position, the elastic piece 20 deforms and disengages from the adaptation window 12.

The handle 3 always remains connected to the connector 2. A position relationship between the handle 3 and the connector 2 is adjusted through pulling the handle 3 to adjust a state of the elastic piece 20. During the sliding of the handle 3 from the first position to the second position, the elastic piece 20 deforms and disengages from the adaptation window 12, thus separating the connector 2 from the adapter 1. If it is necessary to connect the connector 2 to the adapter 1, the connector 2 can be pushed along the adaptation slide 11 to achieve the connection.

Referring to FIG. 3, the connector 2 further includes a connector main body 21 and a connector secondary body 22, where the connector main body 21 can be configured in the adapter 1, the connector secondary body 22 is configured in the handle 3, an abutting step face 210 is formed between the connector main body 21 and the connector secondary body 22, and a limiting protrusion 220 is formed at one end of the connector secondary body 22 facing away from the connector main body 21. The abutting step face 210 limits the first position, and the limiting protrusion 220 limits the second position.

One end of the connector main body 21 close to the connector secondary body 22 is gradually narrowed along the Z-axis direction, one end of the elastic piece 20 is disposed on the connector main body 21, and the other end of the elastic piece 20 extends to a lateral side of the limiting protrusion 220.

The connector main body 21 is shaped to gradually narrow along the Z-axis direction at an end thereof so that a movement range of the elastic piece 20 along the Z-axis direction is further increased, and a portion of the elastic piece 20 that is farther away from the adapter 1 has a larger movement range.

The elastic piece 20 is provided with a first protrusion portion 201 and a second protrusion portion 202, where the first protrusion portion 201 is configured to engage with the adapter window 12 in a snap-fit way, and the second protrusion portion 202 is configured to engage with the handle 3.

It is to be noted that the first protrusion portion 201 is disposed on a surface of the elastic piece 20, and the second protrusion 202 extends outwards from an end of the elastic piece 20 and forms an obtuse angle with the elastic piece 20.

In the present embodiment, two ends of the connector 2 along a Z-axis direction are each provided with an elastic piece 20, where a front end of one elastic piece 20 on an upper side of FIG. 3 is further provided with a key 203, and the key 203 fits in the adaptation slide 11. That is, in a case where the connector 2 is aligned with the adaptation slide 11, the key 203 slips into the adaptation slide 11, thereby making the connector 2 and the adapter 1 more stable when connected.

Figure 5:
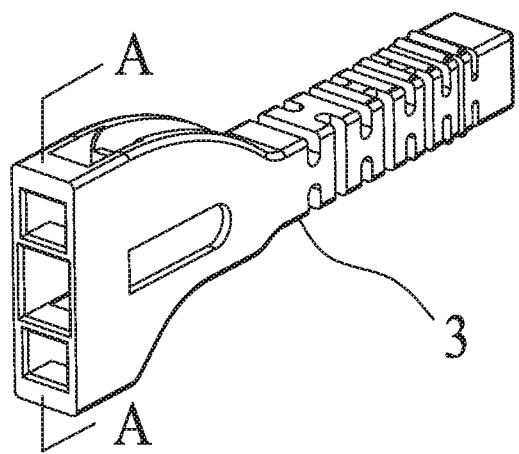
FIG. 5 is a structure view of a handle of the connector assembly according to the embodiment of the present disclosure.
Figure 6:
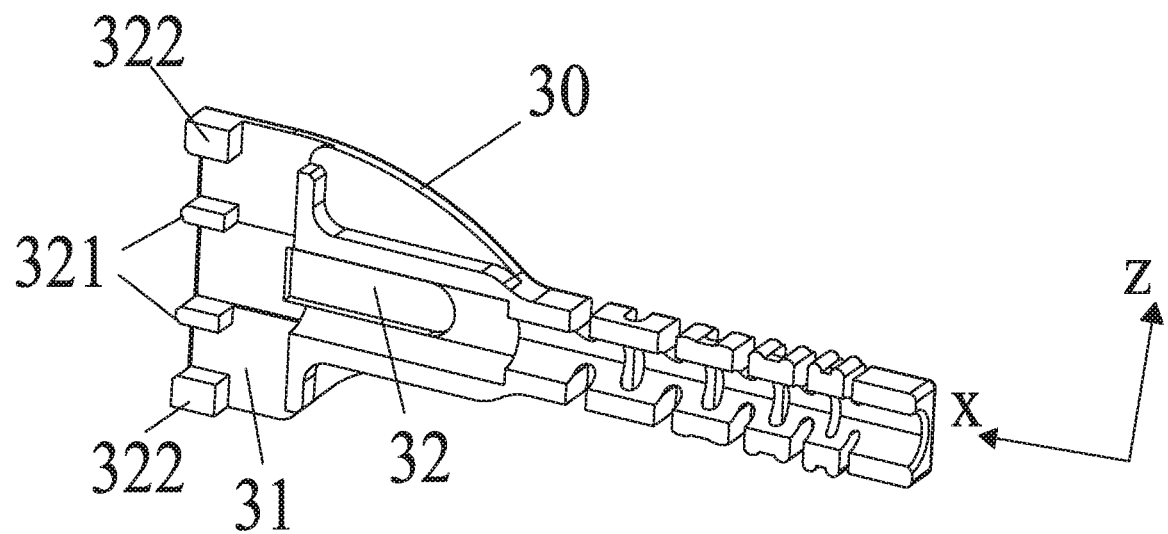
FIG. 6 is a cross-sectional view taken along a line A-A of a handle shown in FIG. 5.

Referring to FIGS. 5 and 6, a front handle interface 31 extending along the Z-axis direction is disposed at a front end of the handle 3, and a rear handle interface 32 extending along the X-axis direction is formed at a rear end of the front handle interface 31, where the front handle interface 31 is communicated with the rear handle interface 32, the connector secondary body 22 is slidably disposed in the front handle interface 31 and the rear handle interface 32, and the second protrusion portion 202 can engage with the front handle interface 31.

A front end of the front handle interface 31 is provided with two first detent mechanisms 321, the connector secondary body 22 protrudes into the front handle interface 31 and the rear handle interface 32 from between the two first detent mechanisms 321, and the two first detent mechanisms 321 are slidably disposed between the abutting step face 210 and the limiting protrusion 220.

The front end of the front handle interface 31 is provided with a second detent mechanism 322, where the second detent mechanism 322 is disposed at a lateral side of the two first detent mechanisms 321 along the Z-axis direction, and the second protrusion portion 202 is configured to be guided by the second detent mechanism 322 to move along the Z-axis direction.

Further, the front handle interface 31 is a through interface along the Z-axis direction.

Further, a side of the handle 3 corresponding to the key 203 is provided with an appearance protrusion 30.

The appearance protrusion 30 is provided on the side of the handle 3 corresponding to the key 203 so that it is convenient to distinguish an insertion direction.

Apparently, the above embodiments of the present disclosure are merely illustrative of the present disclosure and are not intended to limit the embodiments of the present disclosure. Those skilled in the art can make various apparent modifications, adaptations and substitutions without departing from the scope of the present disclosure. Embodiments of the present disclosure cannot be and do not need to be exhausted herein. Any modifications, equivalent substitutions and improvements within the spirit and principle of the present disclosure fall within the scope of the claims of the present disclosure.

What is claimed is:

1. A connector assembly, comprising:
an adapter, wherein a first socket is formed at one end of the adapter, an adaptation slide extending inwards from the first socket is formed in an inner wall of the adapter, and an adaptation window is opened at one end of the adaptation slide close to the first socket;

a connector, wherein the connector is provided with an elastic piece, and the elastic piece is movable along a Z-axis direction; and a handle, wherein the handle is connected to a rear end of the connector and is capable of sliding between a first position and a second position of the connector along an X-axis direction, wherein a front end of the connector is capable of being inserted in the adaptation slide along the X-axis direction so that the elastic piece engages with the adaptation window in a snap-fit way, and during a sliding of the handle from the first position to the second position, the elastic piece deforms and disengages from the adaptation window, wherein the elastic piece is provided with a first protrusion portion and a second protrusion portion, the first protrusion portion is configured to engage with the adaptation window in a snap-fit way, and the second protrusion portion is configured to engage with the handle, and wherein during the sliding of the handle from the first position to the second position, the second protrusion portion is guided by the handle to move along the Z-axis direction so that the elastic piece is deformed to enable disengagement of first protrusion portion from the adaptation window.

2. The connector assembly of claim 1, wherein the connector further comprises a connector main body and a connector secondary body; wherein the connector main body is capable of being configured in the adapter, the connector secondary body is configured in the handle, an abutting step face is formed between the connector main body and the connector secondary body, and a limiting protrusion is formed at one end of the connector secondary body facing away from the connector main body; and wherein the abutting step face limits the first position, and the limiting protrusion limits the second position.

3. The connector assembly of claim 2, wherein one end of the connector main body close to the connector secondary body is gradually narrowed along the Z-axis direction, one end of the elastic piece is disposed on the connector main body, and the other end of the elastic piece extends to a lateral side of the limiting protrusion.

4. The connector assembly of claim 1, wherein a front end of the handle is provided with a front handle interface extending along the Z-axis direction, and a rear handle interface extending along the X-axis direction is formed in a rear end of the front handle interface, the front handle interface is communicated with the rear handle interface, the connector secondary body is slidably disposed in the front handle interface and the rear handle interface, and the second protrusion portion is capable of engaging with the front handle interface.

5. The connector assembly of claim 4, wherein a front end of the front handle interface is provided with two first detent mechanisms, the connector secondary body protrudes into the front handle interface and the rear handle interface from between the two first detent mechanisms, and the two first detent mechanisms are slidably disposed between the abutting step face and the limiting protrusion.

6. The connector assembly of claim 5, wherein the front end of the front handle interface is provided with second detent mechanisms, wherein the second detent mechanisms are disposed at lateral sides of the two first detent mechanisms along the Z-axis direction, and the second protrusion portion is configured to be guided by the second detent mechanisms to move along the Z-axis direction.

7. The connector assembly of claim 6, wherein the front handle interface is a through interface along the Z-axis direction.

8. The connector assembly of claim 1, wherein two ends of the connector along the Z-axis direction are provided with two elastic pieces on a one-to-one basis, wherein a front end of one of the two elastic pieces is further provided with a key, and the key fits in the adaptation slide.

9. The connector assembly of claim 8, wherein a side of the handle corresponding to the key is provided with an appearance protrusion.

* * * * *